United States Patent
Berkvens et al.

(10) Patent No.: US 9,226,370 B2
(45) Date of Patent: Dec. 29, 2015

(54) LIGHTING CONTROL DEVICE

(75) Inventors: Winfried A. H. Berkvens, Sint-Oedenrode (NL); Bartel M. Van De Sluis, Eindhoven (NL); Lina Willems, Delft (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 154 days.

(21) Appl. No.: 13/376,219

(22) PCT Filed: May 31, 2010

(86) PCT No.: PCT/IB2010/052415
§ 371 (c)(1),
(2), (4) Date: Dec. 5, 2011

(87) PCT Pub. No.: WO2010/140107
PCT Pub. Date: Dec. 9, 2010

(65) Prior Publication Data
US 2012/0081030 A1    Apr. 5, 2012

(30) Foreign Application Priority Data
Jun. 5, 2009   (EP) ..................................... 09161999

(51) Int. Cl.
*H05B 37/02* (2006.01)
*H05B 33/08* (2006.01)

(52) U.S. Cl.
CPC ........ *H05B 37/0272* (2013.01); *H05B 33/0863* (2013.01)

(58) Field of Classification Search
CPC . H05B 33/0806; H05B 33/0815; H05B 37/02
USPC ................... 315/291, 297, 307–308
See application file for complete search history.

(56) References Cited

U.S. PATENT DOCUMENTS

| | | | | |
|---|---|---|---|---|
| 6,150,773 A * | 11/2000 | Ribarich et al. | ............. | 315/291 |
| 7,167,777 B2 * | 1/2007 | Budike, Jr. | ................... | 700/297 |
| 7,550,931 B2 * | 6/2009 | Lys et al. | ...................... | 315/291 |
| 7,868,905 B2 * | 1/2011 | Kerr | ............................... | 345/83 |
| 7,950,807 B2 * | 5/2011 | Shirasu et al. | ................. | 353/85 |
| 7,956,552 B2 * | 6/2011 | Champion et al. | ............ | 315/291 |

(Continued)

FOREIGN PATENT DOCUMENTS

| | | |
|---|---|---|
| CN | 101336024 A | 12/2008 |
| DE | 102007049480 A1 | 4/2009 |

(Continued)

OTHER PUBLICATIONS

Hospitality: 03, Case Study: Park Hyatt Paris-Vendome, pp. 1-4, highlighted items, Paris, France, 2004.

*Primary Examiner* — Jason M Crawford
(74) *Attorney, Agent, or Firm* — Meenakshy Chakravorty

(57) ABSTRACT

A lighting control device for controlling one or more lighting parameters of each of one or more light sources is disclosed. The lighting control device comprises at least a first user interaction element, an element appearance control unit, a light setting control unit, and a memory for saving at least a first light setting, the first light setting comprising values of the one or more lighting parameters. The light setting control unit is adapted to set the lighting parameters according to the first light setting in response to an input via the first user interaction element. The element appearance control unit is adapted to set a first appearance associated with the first user interaction element based on at least one of the lighting parameters of the first light setting. Corresponding system, use, methods and computer program product are also disclosed.

14 Claims, 5 Drawing Sheets

(56) References Cited

U.S. PATENT DOCUMENTS

| | | | |
|---|---|---|---|
| 2008/0265797 A1* | 10/2008 | Van Doorn | 315/292 |
| 2008/0316730 A1* | 12/2008 | Diederiks et al. | 362/85 |
| 2009/0072765 A1 | 3/2009 | DeBock | |
| 2009/0218951 A1* | 9/2009 | Weaver | 315/154 |
| 2009/0284187 A1 | 11/2009 | Diederiks et al. | |
| 2010/0052548 A1* | 3/2010 | Allard et al. | 315/154 |

FOREIGN PATENT DOCUMENTS

| | | |
|---|---|---|
| JP | 5255431 A | 10/1993 |
| JP | 6290877 A | 10/1994 |
| JP | 6310284 A | 11/1994 |
| WO | 2006111927 A1 | 10/2006 |
| WO | 2007072294 A1 | 6/2007 |
| WO | 2007072315 A1 | 6/2007 |
| WO | 2007085986 A1 | 8/2007 |
| WO | 2007105151 A1 | 9/2007 |
| WO | 2007125477 A2 | 11/2007 |
| WO | 2008139360 A1 | 11/2008 |
| WO | 2008142601 A2 | 11/2008 |
| WO | 2008146245 A1 | 12/2008 |

* cited by examiner

LIGHTING CONTROL DEVICE

FIELD OF THE INVENTION

The present invention relates generally to the field of lighting control devices. More particularly, it relates to the appearance of user interaction elements of lighting control devices.

BACKGROUND OF THE INVENTION

It is increasingly popular to personalize lighting environments (lighting settings) in, for example, homes, hotels, stores, museums, etc. Different lighting settings may also be termed ambiences or atmospheres. Each lighting setting may involve one or more light sources, and provide a parameter setting for each light source involved. Such parameters may include (but are not limited to) one or more of: hue, saturation and brightness for each light source.

It may be desirable to be able to change between different lighting settings quickly (e.g. without having to adjust each light source involved individually), and to be able to save a lighting setting so that it may easily be used again at some later moment in time. Such functions may be realized by a remote control in which it is possible to store a complete lighting setting under a particular key (e.g. each of the keys 1, 2, . . . , 9, 0 corresponding to a particular lighting setting). Another solution to obtain such function would be to have the light sources controlled by a central computer, in which different lighting settings can be saved as different parameter files.

A problem with such solutions is that people in general find it difficult to remember where something is stored. Therefore, a user of a remote control or computerized lighting control system will often accidentally choose another light setting than intended and will generally have to spend some time trying out the different settings before finding the intended one. This problem is somewhat less pronounced if the user of a computerized lighting control system has named his files properly. Editing the file name (or similar data structure) itself on a conventional remote control is quite difficult or even impossible.

Another problem is that if the lighting system is used by different persons, it is cumbersome for a user to know what settings another user has stored, and where they have been stored. Even for the example of user defined file names, it is highly probable that a file name chosen by a first user does not intuitively describe the lighting setting to a second user and thereby it is cumbersome for the second user to know what settings another user has saved in that file. This will lead to the same cumbersome and irritating situation as described above: accidentally choosing another light setting than intended and having to spend time trying out the different settings before finding the intended one.

These problems become increasingly pronounced when the number of stored lighting settings is large.

Therefore, there is a need for improved representation of stored lighting settings in a lighting control device.

SUMMARY OF THE INVENTION

It is an object of the invention to obviate at least some of the above disadvantages and to provide improved representation of stored lighting settings in a lighting control device. Accordingly, embodiments of the present invention preferably seek to mitigate, alleviate or eliminate one or more of the above-identified deficiencies in the art and disadvantages singly or in any combination and solve at least some of the above mentioned problems by providing a lighting control device with improved representation of stored lighting settings, along with corresponding lighting system, use, method and computer program product, according to the appended claims.

According to a first aspect of the invention this is achieved by a lighting control device for controlling one or more lighting parameters of each of one or more light sources. The lighting control device comprises at least a first user interaction element, an element appearance control unit, a light setting control unit, and a memory for saving at least a first light setting. The first light setting comprises values of the one or more lighting parameters. The light setting control unit is adapted to set the lighting parameters according to the first light setting in response to an input via the first user interaction element, and the element appearance control unit is adapted to set a first appearance associated with the first user interaction element based on at least one of the lighting parameters of the first light setting.

In some embodiments, the element appearance control unit may be adapted to set the first appearance associated with the first user interaction element in response to the first light setting being saved in the memory as a new light setting.

In some embodiments, the element appearance control unit may be adapted to set the first appearance associated with the first user interaction element in response to the first light setting being saved in the memory as an update of a previously saved light setting.

The element appearance control unit may be further adapted to set the first appearance associated with the first user interaction element corresponding to at least one of the lighting parameters of the first light setting.

The first user interaction element may be one of: a mechanical user interaction element, a push button, a key, an on-screen user interaction element, an on-screen icon, an on-screen button, a 3D interaction element, a 3D screen element, a spherical control element, and a holographic interaction element.

The lighting parameters may comprise one or more of: a hue, a saturation, an intensity, a brightness, a red-green-blue (RGB) value, a color temperature, a lighting direction, a light spreading angle, an illumination area, a lighting pattern, and a light dynamics.

The first appearance may comprise one or more of: a hue, a saturation, an intensity, a brightness, a red-green-blue (RGB) value, a color temperature, a shape, a tactile property, a representation of a lighting direction, a representation of a light spreading angle, a representation of an illumination area, a representation of a lighting pattern, a two-dimensional and/or three-dimensional representation of a lighting orientation in a space comprising the one or more light sources, a digital photograph, a video clip, and a dynamic image.

In some embodiments, the element appearance control unit is adapted to set the first appearance of the first user interaction element based on at least one of the lighting parameters of the first light setting.

According to some embodiments, the element appearance control unit may be adapted to determine a plurality of suggested appearances based on at least one of the lighting parameters of the first light setting and to set the first appearance associated with the first user interaction element to an appearance selected by a user from the plurality of suggested appearances.

A second aspect of the invention is a lighting system comprising the lighting control device of the first aspect and the one or more light sources.

A third aspect of the invention is a use of the lighting control device of the first aspect for control of the one or more lighting parameters of each of the one or more light sources.

A fourth aspect of the invention is a method of a lighting control device, the lighting control device being suitable for controlling one or more lighting parameters of each of one or more light sources and comprising at least a first user interaction element, a memory for saving at least a first light setting comprising values of the one or more lighting parameters, and a light setting control unit adapted to set the lighting parameters according to the first light setting in response to an input via the first user interaction element. The method comprises setting a first appearance associated with the first user interaction element based on at least one of the lighting parameters of the first light setting.

In some embodiments, the method further comprises saving the first light setting and associating the first light setting with the first user interaction element.

A fifth aspect of the invention is a computer program product comprising a computer readable medium, having thereon a computer program comprising program instructions, the computer program being loadable into a data-processing unit of a lighting control device. The lighting control device is suitable for controlling one or more lighting parameters of each of one or more light sources and comprises the data-processing unit, at least a first user interaction element, a memory for saving at least a first light setting comprising values of the one or more lighting parameters, and a light setting control unit adapted to set the lighting parameters according to the first light setting in response to an input via the first user interaction element. The computer program is adapted to cause the data-processing unit to execute at least the following step when the computer program is run by the data-processing unit: setting a first appearance associated with the first user interaction element based on at least one of the lighting parameters of the first light setting.

In some embodiments, the second, third, fourth and fifth aspects of the invention may additionally have features identical with or corresponding to any of the various features as explained above for the first aspect of the invention.

Further embodiments of the invention are defined in the dependent claims.

In the context of the description of the invention of embodiments thereof, the term appearance is to be construed as any form of visualization.

An advantage of some embodiments of the invention is that stored lighting settings are visualized in an intuitive way, to enable a user to find an intended light setting quickly and easily.

Another advantage of some embodiments of the invention is that the visualization of stored lighting settings is automated.

According to some embodiments, visualization is determined each time a setting is saved, e.g. a newly created setting, an update of an existing setting, or a changed existing setting saved as a new setting.

Another advantage of some embodiments of the invention is that the user does not have to be involved in the visualization.

In some embodiments, the user is presented with a number of suggested visualizations and can choose among them.

These and other aspects of the invention will be apparent from and elucidated with reference to the embodiments described hereinafter.

BRIEF DESCRIPTION OF THE DRAWINGS

These and other aspects, features and advantages of which the invention is capable of will be apparent and elucidated from the following description of embodiments of the present invention, reference being made to the accompanying drawings, in which.

DETAILED DESCRIPTION OF EMBODIMENTS

Figure 1:
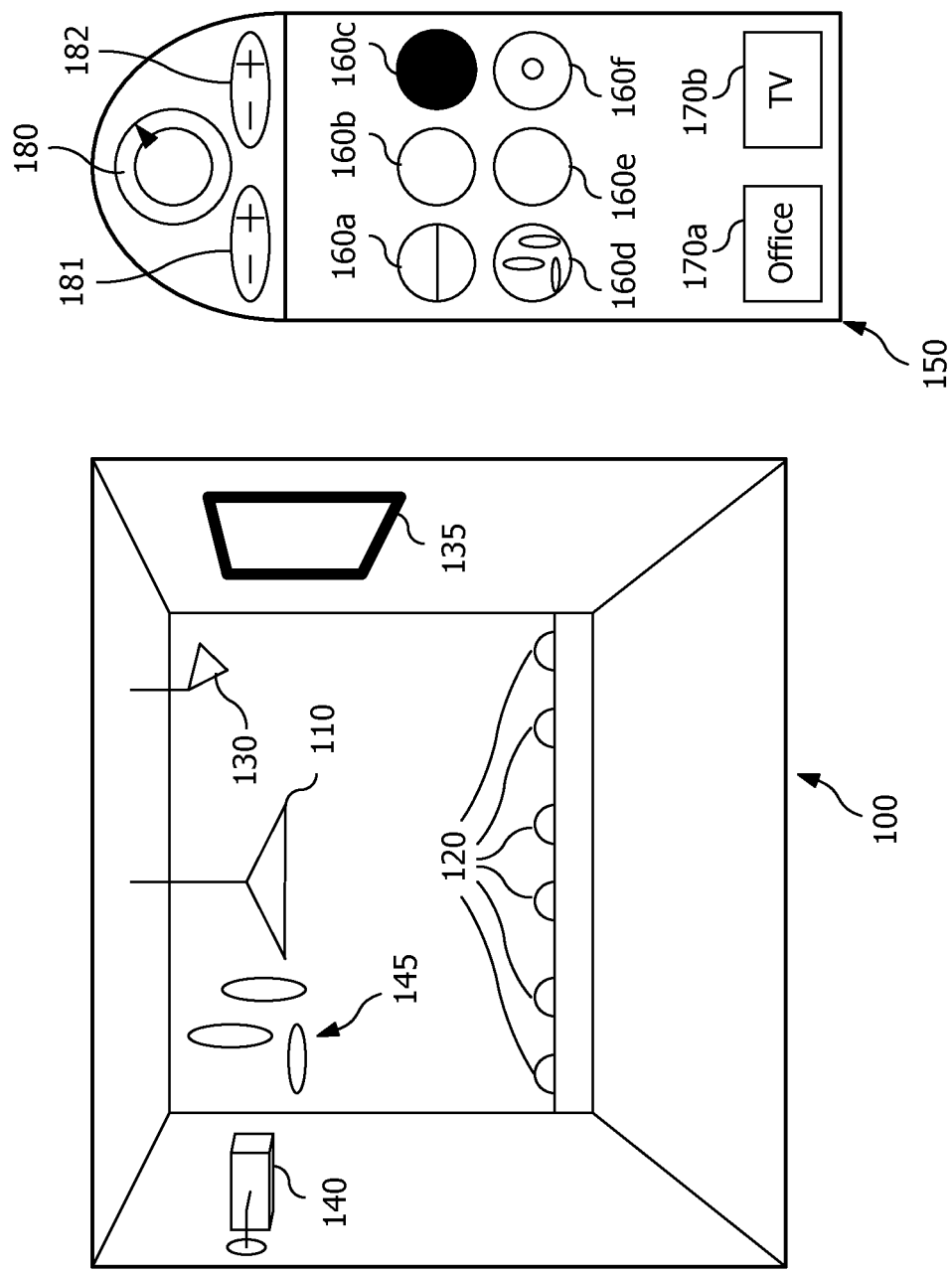
FIG. 1 is a schematic diagram illustrating an environment having a plurality of light sources and a lighting control device according to some embodiments of the invention.

Several embodiments of the present invention will be described in more detail below with reference to the accompanying drawings in order for those skilled in the art to be able to carry out the invention. The invention may, however, be embodied in many different forms and should not be construed as limited to the embodiments set forth herein. Rather, these embodiments are provided so that this disclosure will be thorough and complete, and will fully convey the scope of the invention to those skilled in the art. The embodiments do not limit the invention, but the invention is only limited by the appended claims. Furthermore, the terminology used in the detailed description of the particular embodiments illustrated in the accompanying drawings is not intended to be limiting of the invention.

In a physical environment, people generally find it difficult to remember where they have stowed away (stored) things if the content of e.g. a storing box is not visible from the outside and the box is one of a larger set of boxes with the same look and format. This problem is commonly solved by use of markings on the boxes, hinting the content. A similar problem occurs in the context of lighting atmosphere settings stored in a lighting control device (e.g. a remote control) as explained above.

Adding markings on control devices in a similar way as with the physical boxes may be cumbersome. For example, buttons on a conventional remote control are generally not large enough to contain markings that clearly and intuitively link them to the underlying function (e.g. a stored lighting setting). In the case of a lighting setting it may be hard to find a simple representation to describe the corresponding atmosphere in an unambiguous way. Furthermore, having to adapt the markings when the underlying function is changed may be even more cumbersome and not very user friendly.

To solve such and other problems, embodiments of the invention provide a lighting control device that enables a user to remember and quickly and easily find a stored lighting atmosphere via a user interface of the lighting control device. The stored atmosphere may have been created and stored by the same or another user at an earlier occasion or it may be a pre-programmed atmosphere or a downloaded atmosphere or any combination of these. This may be realized by letting a user interaction element of the user interface visualize the atmosphere in an intuitive way, for example, by letting the visualization be based on a color mixture matching the color mixture of the atmosphere when realized.

The lighting control device may, for example, be a remote control or a computer with software which enables it to control lighting settings. Other examples include, but are not limited to, a mobile communication device such as a mobile telephone or a PDA (personal digital assistant), an interactive shop window, and a television.

As a result, a user will be able to find created and stored lighting atmospheres much easier than with standard buttons. Making mistakes when selecting another atmosphere than the one intended can be a negative experience for the user and is therefore not favorable.

In embodiments of the invention, the lighting control device may be used to control lighting parameters of one or more light sources. A system comprising the one or more light sources and the lighting control device may, for example, be used in home environments, hospitality environments, the retail environments, museums, etc. Such a system may be used for object presentation (e.g. of a product in a store or of an exhibit in a museum), for functional lighting (e.g. in an office) and/or for ambience lighting (e.g. in homes or hotels). Embodiments of the invention may be used for activity related lighting (e.g. having different lighting settings for having dinner and reading a book) or for alarm lighting (e.g. having a particular lighting setting associated with a fire alarm and/or a particular (possibly different) lighting setting associated with a burglar alarm). Embodiments of the invention may also be used in any combination of situations or environments.

An atmosphere corresponds to a particular setting of each of the parameters of each of the light sources involved. Thus, each lighting setting may involve one or more light sources, and provide one or more parameter settings for each light source involved. Such parameters may include (but are not limited to) one or more of: on/off, hue, saturation, brightness, intensity, a lighting direction, a light spreading angle, an illumination area, a lighting pattern and a light dynamics for each light source. Other example parameters may be one or more time indications and/or one or more event indications. Time indications may, for example indicate when—momentarily or as a continuous function of time—another lighting parameter should be changed. Event indications may, for example, associate a particular lighting setting with movement or heat in a room or other environment, with an alarm, with the amount of sunlight that enters the room/environment, with an audio level/dynamics (e.g. associating the light with music) etc. The set of controllable parameters may or may not differ between the light sources involved.

The association between the visualization on the user interaction element and the parameters may be determined completely automatically, e.g. when a user saves a particular lighting setting, according to a pre-determined algorithm as will be described in connection to the example embodiments below. Alternatively, the user may be presented with a number of suggested visualizations (determined according to different algorithms) and a visualization chosen by the user is used on the user interaction element. Yet alternatively, the user may choose one of a number of pre-programmed algorithms, and the visualization on the user interaction element is determined according to the chosen algorithm. Such a choice may, for example, be a one-time choice used for all subsequent determinations, a choice coupled to a user profile set in the lighting control device, or a choice to be made before any visualization determination. There may also be possibilities for a user to design new visualization determination algorithms. In some embodiments, the user may have the option to design the visualization itself. In some embodiments, the user may have the option to request that the visualization stays the same even though the parameter settings are changed.

The association (or matching) between the visualization on the user interaction element and the parameters of the corresponding lighting setting may be a direct association or it may be realized via a more complex algorithm.

For a direct association, the visualization may comprise reproducing the value (exactly or approximately) of one of the parameters of the lighting setting. For example, if one of the light sources (e.g. a main light source or an accent light source) has a particular hue and saturation in a particular lighting setting, these particular values may be reproduced on the corresponding user interaction element. As a further example, if one of the light sources (e.g. a projector or a LED panel) presents a particular pattern according in a particular lighting setting, this particular pattern may be reproduced (exactly or stylized, in full or partly) on the corresponding user interaction element. According to some embodiments of the invention, a digital photograph or video-clip may be reproduced (partly or in full) as the visualization on the user interaction element.

There are numerous variations of other possible algorithms to use for determining the visualization based on the parameters of the corresponding lighting setting.

The orientation of lighting in a space to be lit may be considered when determining the visualization. For example, if a particular atmosphere has a reddish glow in a lower part of a space to be lit (e.g. a room) and a blue illumination of an upper part of the same space, the visualization may comprise reproducing a red tone on a "lower" half of the corresponding user interaction element and a blue tone on an "upper" half of the user interaction element. The transition in the visualization from red to blue in such an example may be abrupt or gradual. Other than bottom-top transitions as exemplified above, orientation based visualizations include (but are not limited to) left-right transitions, center-peripheral transitions and any combinations thereof.

In some embodiments, the visualization is on a two-dimensional (2D) medium such as a touch screen or a button surface. In other embodiments the visualization is on a three-dimensional (3D) medium such as a 3D screen or a spherical tool. Combinations of 2D and 3D visualization may also be envisioned.

As a further example, if an atmosphere lights up a limited, central part of a room and leaves the rest of the room in darkness, the visualization may comprise reproducing a bright circle in the center of the corresponding user interaction element.

Some embodiments may involve combining different parameters (e.g. hue, saturation and intensity) in the visualization. Some embodiments may involve combining parameter values of the same parameter for different light sources according to a combination function (e.g. an average function or a median function, the dominance of a parameter or of an area in the environment) in the visualization. This may also be combined with the 2D and 3D visualization examples above.

In some embodiments (in particular embodiments with on-screen visualization), the form and/or the feel (i.e. tactile property) of the user interaction element may (additionally or alternatively) be changed based on the lighting setting. For example, an atmosphere that may be considered as romantic may be visualized with its corresponding hue and saturation values as above, but on a heart-shaped user interaction element (e.g. icon) instead of the form conventionally used in the embodiment (e.g. round or square). As another example, an atmosphere that may be suitable for reading may be visualized with its corresponding hue and saturation values as above, and on a book-shaped user interaction element (e.g. icon). An example of a feel of the user interaction element may be a user interaction element that is warm or of mild temperature when it represents a lightning atmosphere that is perceived as cozy (e.g. having red tones). If the user interaction element was to represent a more strict lighting atmosphere (e.g. having blue tones or cold white light), the user interaction element could be cold. Such an embodiment may be realized by incorporating (or associating with) a heating and/or refrigerating element in the user interaction element.

In some embodiments, the visualization is completely non-textual. In other embodiments, the visualization may comprise textual information (for example entered by a user after being prompted by the lighting control device).

In some embodiments, lighting settings may be dynamic (i.e. one or more of the lighting parameter values change over time). In such embodiments, the visualization on the user interaction element may be dynamic as well. For example, a visualization may be pulsating (one or more of the parameters changing in cycles) to show that it represents a lighting setting that associates its dynamics with a music beat. Another example may be the heart-shaped visualization mentioned above with the addition that the shape borders and/or other parameters of the visualization may be a pulsating to show that it represents a romantic lighting setting. Other examples of dynamic light settings that may be mirrored or otherwise represented in the visualization are dynamic light waves in a room and a twenty-four hour (or only day) cycle lighting (e.g. having a sun-like projection moving across the room during day-time).

The user interaction element may comprise a mechanical element (e.g. a mechanical button or key), an on-screen element (e.g. an on-screen button or an on-screen icon), a 3D interaction element (e.g. a spherical control element), a holographic interaction element, or any other selection element envisioned. Selection by the user may be performed by any suitable selection technique such as, for example, pushing a mechanical button or key, touching an on-screen button on a touch screen, or clicking on an icon using a mouse or touch pad.

The visualization on on-screen user interaction elements may comprise conventional screen visualization techniques, 3D visualization techniques, projection techniques, or other visualization techniques.

Some embodiments may include using color filters and/or colored light sources for the representation on a mechanical user interaction element.

The visualization on mechanical user interaction elements may, according to some embodiments, comprise multiple RGB LED packages (red-green-blue light emitting diode) integrated in a (translucent) button or other representation area. In some embodiments, each of the RGB LED packages may be controlled independently.

In some embodiments, the visualization (e.g. RGB LED enabled buttons) may only become active if the lighting control device is being approached, touched or moved. These embodiments may include one or more sensors to detect the approaching, touching and/or moving of the device. Such an approach may have the advantage of saving energy.

It is to be noted that the visualization may be realized on the actual user interaction element, but it may also be realized in the near vicinity of the user interaction element or in association with the user interaction element. For example, a lighting control device may have its user interaction elements arranged as a number of mechanical keys in a key pad (i.e. to select a lighting setting a mechanical key is to be pushed), while the visualization is realized on a screen where the keypad geometry is depicted with the determined visualization added to each depicted key. Some embodiments may have the visualization realized by projecting it on, for example, a wall (e.g. using a beamer/projector in a remote control). In yet some embodiments, the visualization may be in 3D (for example on a spherical element or a 3D screen). In such embodiments, the visualization may be viewed from several angles. The 3D visualization medium may simultaneously act as a user interaction element (e.g. by being sensitive to touches) or it may serve as a visualization toll only, separated from (but associated with) the user interaction element as explained above.

FIG. 1 illustrates a room 100 having a plurality of light sources and a lighting control device 150 according to some embodiments of the invention.

The plurality of light sources includes a ceiling lamp 110 providing main lighting of the room, a bank of lights 120 providing ambience lighting of the back wall, a spotlight 130 providing illumination of a painting 135, and a projector 140 providing ambience lighting 145 (possibly dynamic and possibly with patterns or other images) projected on the back wall. An example parameter set for this lighting system might include the intensity of the ceiling lamp 110, the hue, saturation and intensity of the bank of lights 120, the intensity, direction and spreading angle of the spotlight 130, and the pattern and dynamics of the projector 140.

The lighting control device 150 comprises various user control elements 180, 181, 182. Each of these user control elements may be adapted to set and adjust a value of one or more of the parameters of the light sources. For example, the control wheel 180 may be used to vary the hue of the bank of lights 120. The dual control button 181 may be used to control the intensity of the ceiling lamp 110, the saturation and intensity of the bank of lights 120, and the intensity, direction and spreading angle of the spotlight 130. The dual control button 182 may be used to select a pattern and dynamics program for the projector 140, and to toggle the function of the dual control button 181 (between saturation and intensity when the bank of lights 120 is to be controlled, and between intensity, direction and spreading angle when the spotlight 130 is to be controlled).

To determine which one of the light sources is currently under control by the lighting control device, the device may be aimed at a light source and a dedicated button (not shown) may be pushed. Alternatively, any button may be held for a pre-determined time duration when the device is aimed at a light source. Other solutions may also be possible, for example, each light source may have a dedicated select element on the device. A control signal is transmitted from the lighting control device 150 and the selected lamp responds (e.g. by blinking) to verify that it has been selected.

The lighting control device 150 also comprises a number of user interaction elements 160a-f, 170a-b used for storing lighting settings. In this embodiment, the user interaction elements are mechanical buttons. Each of the user interaction elements 160a-f may present a visualization corresponding to the underlying lighting setting.

In this example, user interaction element 160a shows a lower part in a first color and an upper part in a second color, which corresponds to a setting where the bank of lights 120 has the first color and the projector 140 shows an image having the second color as the main color. User interaction element 160c shows a left part in darkness and a right part in bright light, which corresponds to a setting where the spotlight 130 is lit with large intensity and the rest of the light sources are turned off (or set to a very low intensity). User interaction element 160d shows a pattern, which corresponds to a setting where the projector 140 shows a corresponding pattern. User interaction element 160f shows a center part in bright light and the surroundings in a color, which corresponds to a setting where the ceiling lamp 110 is lit with large intensity and the bank of lights 120 has the corresponding color.

In this embodiment, user interaction elements 170a-b represents functional light settings that are represented by a text on the element. The text may be pre-printed or typed in by a user. User interaction element 170a shows the text "Office" which may correspond to a light setting with good main lighting (high intensity) and a table lamp (not shown) being lit. User interaction element 170b shows the text "TV" which may correspond to a light setting with less intense main lighting and ambience lighting by the bank of lights 120 of low intensity. The functional light settings may be combined with any of the lighting settings under user interaction elements 160a-f (e.g. by pushing user interaction elements 170a and 160d sequentially during a limited time duration). Each of the user interaction elements 170a-b may also show a visualization corresponding to the underlying lighting setting in combination with the textual information.

Figure 2:
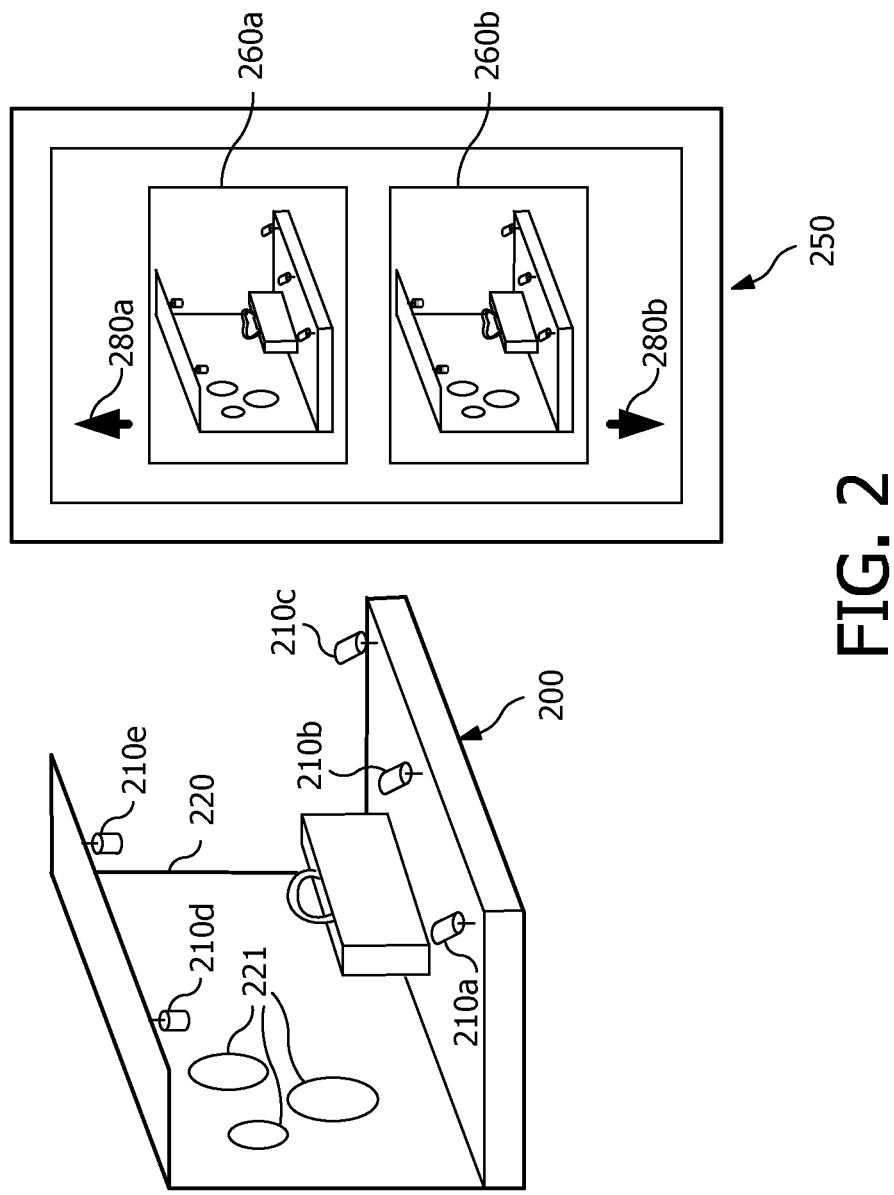
FIG. 2 is a schematic diagram illustrating a product display having a plurality of light sources and a lighting control device according to some embodiments of the invention.

FIG. 2 illustrates a product display 200 having a plurality of light sources and a lighting control device 250 according to some embodiments of the invention.

The plurality of light sources includes spotlights 210a-e providing illumination of the product from different angles, and a LED panel 220 providing background lighting 221 (possibly dynamic and possibly with patterns or other images) of the back wall of the display.

An example parameter set for this lighting system might include the hue, saturation, intensity, direction and spreading angle of the spotlights 210a-e (controlled individually), and the pattern and dynamics of the LED panel 220.

The lighting control device 250 comprises a number of user interaction elements 260a-b used for storing lighting settings. In this embodiment, the user interaction elements are touch areas of a touch screen. Further user interaction elements may be shown on the screen by browsing via the interaction elements 280a-b. Each of the user interaction elements 260a-b present a visualization corresponding to the underlying lighting setting. In this embodiment, the visualization comprises a photo (or a video clip) of the product display with the corresponding lighting setting.

Figure 3:
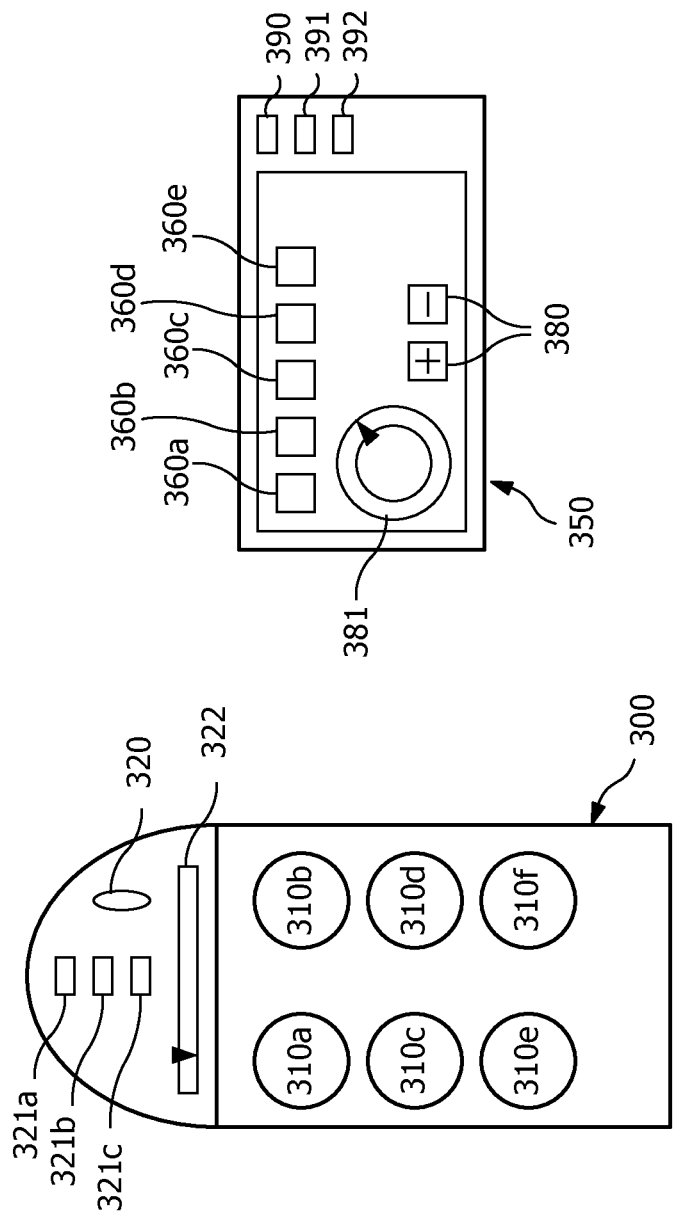
FIGS. 3A and B are schematic diagrams illustrating example lighting control devices according to some embodiments of the invention.

FIG. 3A illustrates a lighting control device 300 according to some embodiments of the invention. The lighting control device 300 comprises various user control elements 320, 321a-c, 322. Each of these user control elements may be adapted to set and adjust a value of one or more parameters of one or more light sources. The lighting control device 300 also comprises a number of user interaction elements 310a-f, used for storing lighting settings. In this embodiment, the user interaction elements and the user control elements are mechanical buttons/regulators. Each of the user interaction elements 310a-f may present a visualization corresponding to an underlying lighting setting.

FIG. 3B illustrates a lighting control device 350 according to some embodiments of the invention. The lighting control device 350 comprises various user control elements 380, 381, 390, 391, 392. Each of these user control elements may be adapted to set and adjust a value of one or more parameters of one or more light sources. The lighting control device 350 also comprises a number of user interaction elements 360a-e, used for storing lighting settings. In this embodiment, the user interaction elements are on-screen (selectable) icons. Of the user control elements, some are mechanical buttons and some are on-screen regulators. Each of the user interaction elements 360a-e may present a visualization corresponding to an underlying lighting setting.

Figure 4:
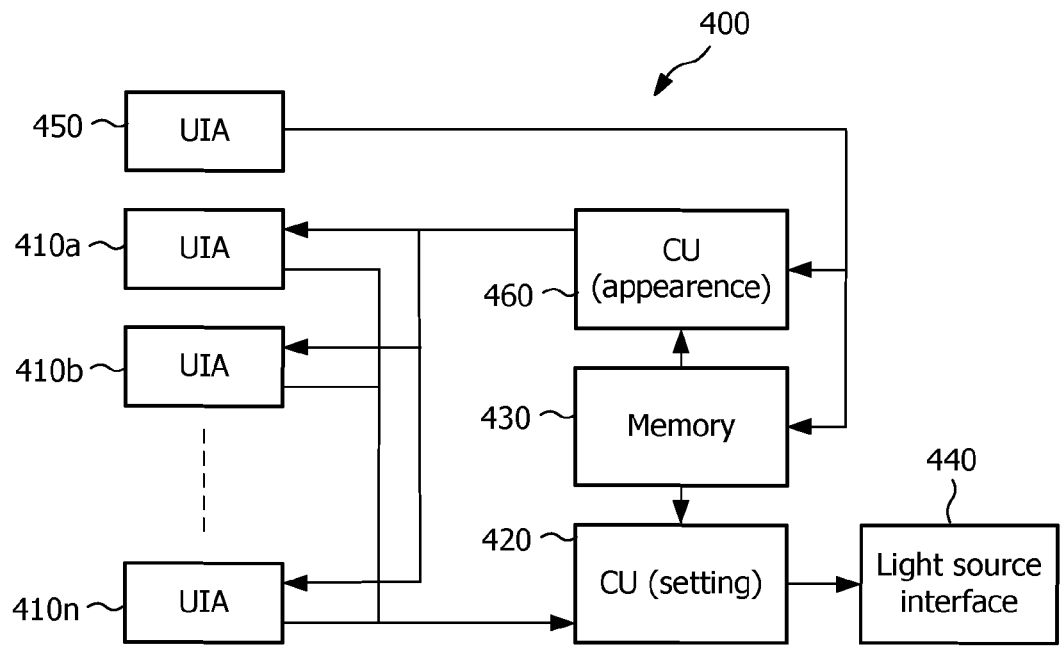
FIG. 4 is a block diagram illustrating an arrangement for a lighting control device according to some embodiments of the invention.

FIG. 4 illustrates an arrangement 400 according to some embodiments of the invention. The arrangement 400 may be used in a lighting control device for controlling one or more lighting parameters of each of one or more light sources such as, for example, in any of the lighting control devices 150, 250, 300, 350.

The arrangement comprises a number of user interaction elements (UTA) 410a-n that may be used for storing lighting settings. Each of the user interaction elements 410a-n may present a visualization corresponding to an underlying stored lighting setting. The arrangement further comprises a memory 430 for saving the parameter values of each of the stored light settings.

A light setting control unit (CU (setting)) 420 of the arrangement 400 is adapted to set the lighting parameters of the one or more light sources according to a particular light setting in response to an input via a user interaction 410a-n element corresponding to the particular setting. The parameter values are read from the memory 430 and the setting of parameter values is communicated to the light sources via a light source interface 440. The light source interface 440 may include any suitable wireless or wired communication interface between the light sources and the arrangement 400.

The arrangement further comprises an element appearance control unit (CU (appearance)) 460. The element appearance control unit 460 is adapted to set the appearance of the user interaction elements 410a-n such that they visualize the underlying lighting setting. For example, when a new lighting setting is saved via user interaction element (UTA) 450 (e.g. a "save"-button) the new setting is written to the memory 430 and the operation of the element appearance control unit 460 is initiated.

The element appearance control unit 460 collects the parameter values needed from the new setting and sets the appearance of the user interaction element representing the new setting based on at least one of the lighting parameters of the new light setting as explained above. The parameter values may be read from the memory 430.

As noted before, the element appearance control unit 460 may alternatively set an appearance associated with the user interaction element representing the new setting based on at least one of the lighting parameters of the new light setting. As in the example above where a lighting control device has its user interaction elements arranged as a number of mechanical keys in a key pad while the visualization is realized on a screen where the keypad geometry is depicted with the determined visualization added to each depicted key.

It is noted that the user interaction element 450 may or may not coincide with one or more of the user interaction elements 410a-n. It may be a separate "save" input element or the saving operation may be realized by performing a "save" input action (e.g. pressing a key for a pre-determined duration of time).

Figure 5:
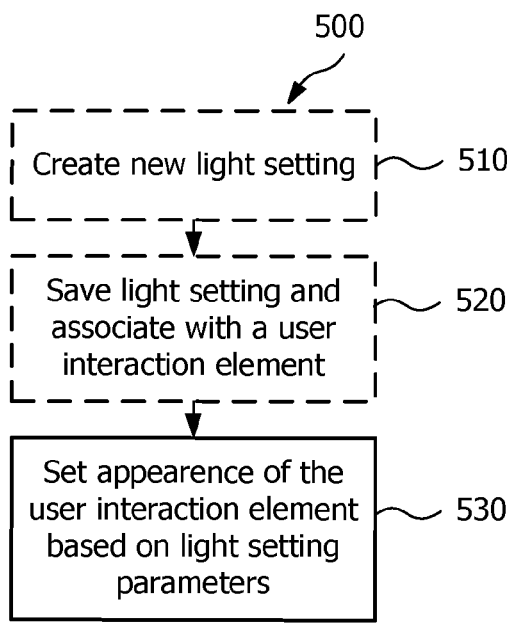
FIG. 5 is a flow chart illustrating example method steps according to some embodiments of the invention.
Figure 6:
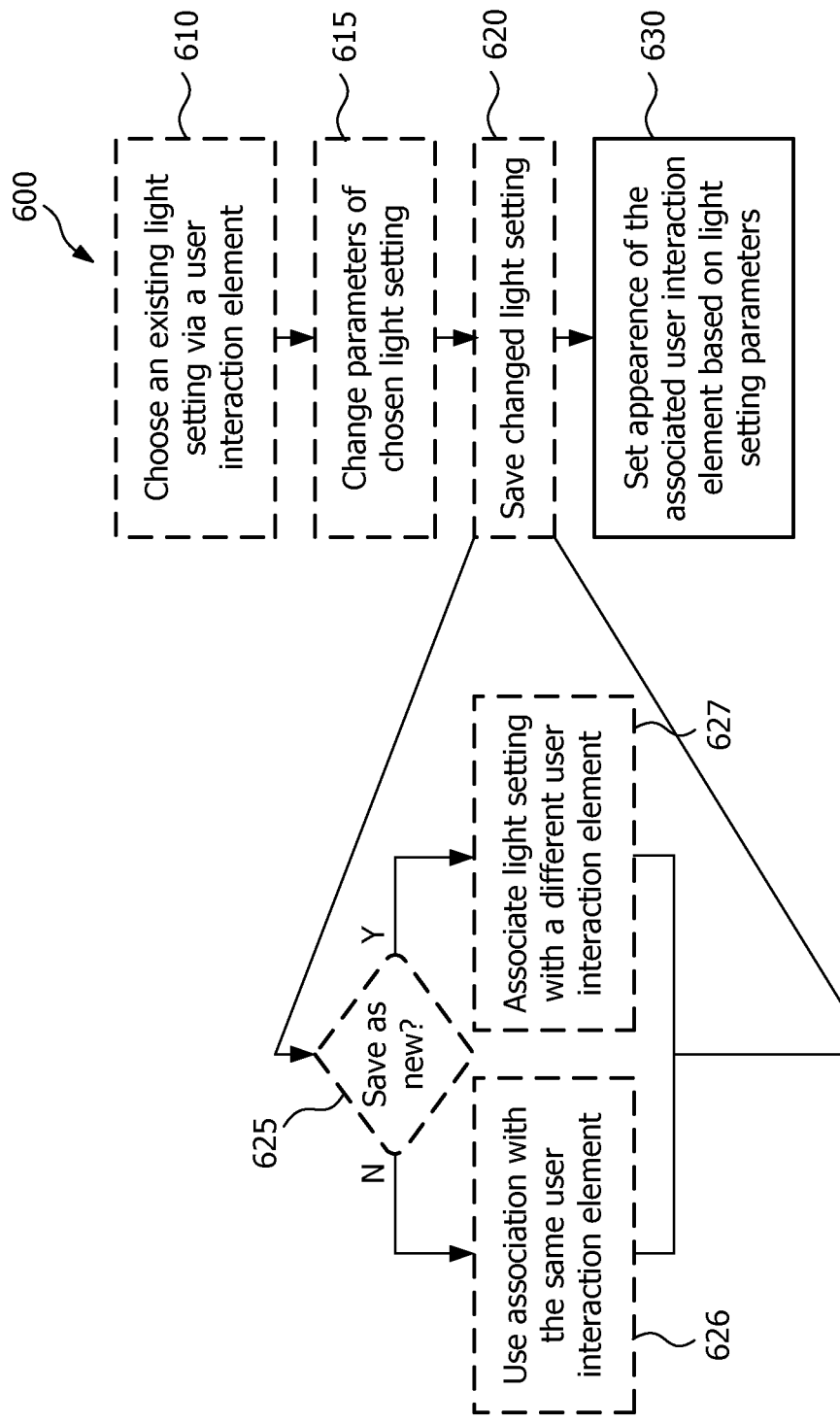
FIG. 6 is a flow chart illustrating example method steps according to some embodiments of the invention.

FIGS. 5 and 6 illustrate example methods 500 and 600 according to some embodiments of the invention. The example methods 500 and 600 may be performed by a lighting control device for controlling one or more lighting parameters of each of one or more light sources such as, for example, any of the lighting control devices 150, 250, 300, 350. The example methods 500 and 600 may also be performed by an arrangement for a lighting control device such as, for example, the arrangement 400.

The example method 500 starts in step 510 where a user creates a new light setting. This may be done manually at each light source or via the lighting control device (for example via any of the user control elements 180, 181, 182, 320, 321*a-c*, 322, 380, 381, 390, 391, 392). In the latter case, the parameter values are communicated to the light sources involved, and the new light setting is presented in the environment.

When the user is happy with the new light setting and decides that he/she may want to use it later, the light setting is saved in step 520. In the saving process, the lighting setting is associated with a user interaction element. This association may be automatic (e.g. the lighting control device allocates a user interaction element when a save button is pushed) or it may be determined by the user (e.g. if the saving is realized by pressing the intended user interaction element for a particular duration of time, or if the saving is realized by pressing first a save button and then the intended user interaction element).

In step 530, the appearance of the associated user interaction element is set based on one or more of the parameter values of the light setting. Various implementations of the determination of the appearance have been explained above. If the user created the light setting in step 510 via manual interaction with one or more of the light sources, the parameter setting of that light source may be communicated to the lighting control device for the operation in step 530. Such communication may include wireless or wired communication from the light source to the lighting control device, parameter sensors integrated or associated with the lighting control device, or manually inputting of parameter values at the lighting control device.

The example method 600 starts in step 610 where a user selects an existing lighting setting by interacting with the corresponding user interaction element. The light setting parameter values are communicated to the light sources involved, and the light setting is presented in the environment. In step 615, the user changes the lighting setting by adjusting one or more of the parameter values. This may be done manually at each light source or via the lighting control device (for example via any of the user control elements 180, 181, 182, 320, 321*a-c*, 322, 380, 381, 390, 391, 392). In the latter case, the parameter values are communicated to the light sources involved, and the changed light setting is presented in the environment.

When the user is happy with the changed light setting and decides that he/she may want to use it later, the light setting is saved in step 620. In the saving process, the lighting setting is associated with a user interaction element. In sub-step 625, it is determined whether the changed setting is to be saved as a new setting (keeping also the setting chosen in step 610) or as an update of the setting chosen in step 610. This determination may be automatic (e.g. the lighting control device always saving as an update as default) or it may be determined by the user (e.g. by interaction with the user interaction element intended for representation of the changed setting, or by responding to a prompt from the lighting control device). If the changed setting is to be saved as an update of the setting chosen in step 610 (NO-path out of sub-step 625) the changed setting is associated in sub-step 626 with the same user interaction element as the setting chosen in step 610 was. If the changed setting is to be saved as a new setting (YES-path out of sub-step 625) the changed setting is associated in sub-step 627 with a different user interaction element than the setting chosen in step 610 is.

In step 630, the appearance of the associated user interaction element is set based on one or more of the parameter values of the changed light setting. Various implementations of the determination of the appearance have been explained above.

In some embodiments, step 630 may be slightly modified. For example, if the changed setting is to be saved as an update of the old setting (NO-path out of sub-step 625), there may be a functionality in step 630 that prompts the user with a question of whether to determine a new appearance based on the changed setting or keep the old appearance. Alternatively, a new appearance based on the changed setting is determined as a default function in step 630, but the determination may be overridden via a user input.

In some embodiments, a lighting control device may be adapted to prompt the user (in steps 530 and 627) with a question which setting to overwrite if all the available user interaction elements are already representing a lighting setting.

There is control signaling from the lighting control device to the various light sources. In some embodiments, there may also be provided for signaling from the light sources to the lighting control device (e.g. in the case where the parameter values are adapted manually at each light source, the light sources may transmit the adapted parameter values to the lighting control device for saving).

The described embodiments of the invention and their equivalents may be realized in any suitable form, e.g. software or hardware or a combination thereof. They may be performed by general-purpose circuits, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of the invention.

The invention may be embodied within an arrangement comprising circuitry/logic or performing methods according to any of the embodiments of the invention.

According to some embodiments of the invention, a computer program product comprises a computer readable medium such as, for example, a diskette or a CD-ROM. The computer readable medium may have stored thereon a computer program comprising program instructions. The computer program may be loadable into a data-processing unit, which may, for example, be comprised in a lighting control device. When loaded into the data-processing unit, the computer program may be stored in a memory associated with or integral to the data-processing unit. According to some embodiments, the computer program may, when loaded into and run by the data-processing unit, cause the data-processing unit to execute at least some of the method steps according to, for example, the methods shown in any of the FIG. 5 or 6.

The invention has been described herein with reference to various embodiments. However, a person skilled in the art would recognize numerous variations to the described embodiments that would still fall within the scope of the invention. For example, the method embodiments described herein describes example methods through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that in the description of embodiments of the invention, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention. Thus, although individually listed, a plurality of means, elements or method steps may be implemented by e.g. a single unit or processor.

The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Hence, although the present invention has been described above with reference to specific embodiments, it should be understood that the limitations of the described embodiments are merely for illustrative purpose and by no means limiting. Instead, the scope of the invention is defined by the appended claims rather than by the description, and all variations that fall within the range of the claims are intended to be embraced therein. Thus, other embodiments than the specific ones described above are equally possible within the scope of these appended claims.

It should be emphasized that the term "comprises/comprising" when used in this specification or in the claims is taken to specify the presence of stated features, integers, steps, or components, but does not preclude the presence or addition of one or more other features, integers, steps, components, or groups thereof.

Although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A lighting control device for controlling one or more lighting parameters of each of one or more light sources, the device comprising:
   a touch screen display with at least a first touch area comprising at least a first user interaction element displayed on the first touch area of the touch screen display for receiving a user input and arranged to store at least a first lighting setting including at least one lighting parameter value for at least one light source from the one or more light sources;
   a memory for saving the lighting parameter values of the stored at least a first light setting;
   a plurality of user control elements adapted to adjust a value of at least one lighting parameter value for the at least one light source;
   a transmitter operable to send a select control signal to at least one selected light source of the light sources;
   a light setting control unit adapted to set the lighting parameters of the at least one selected light source according to the first light setting in response to the user input received via the first user interaction element,
   an element appearance control unit adapted to automatically set a first appearance associated with the at least first user interaction element based on at least one lighting parameter value of the first light setting stored by the at least first user interaction element,
   wherein the first appearance includes a representation on the first touch area of the touch screen display of the first light setting to enable a user to intuitively find and select the stored first light setting on the lighting control device.

2. The lighting control device of claim 1, wherein the element appearance control unit is adapted to set the first appearance associated with the first user interaction element in response to the first light setting being saved in the memory as a new light setting.

3. The lighting control device of claim 1, wherein the element appearance control unit is adapted to set the first appearance associated with the first user interaction element in response to the first light setting being saved in the memory as an update of a previously saved light setting.

4. The lighting control device of claim 1, wherein the element appearance control unit is further adapted to set the first appearance associated with the first user interaction element corresponding to at least one of the lighting parameters of the first light setting.

5. The lighting control device of claim 1, wherein the first user interaction element is one of: a mechanical user interaction element, a push button, a key, an on-screen user interaction element, an on-screen icon, an on-screen button, a 3D interaction element, a 3D screen element, a spherical control element, and a holographic interaction element.

6. The lighting control device of claim 1, wherein the lighting parameters comprise one or more of:
   a hue;
   a saturation;
   an intensity;
   a brightness;
   a red-green-blue—RGB—value;
   a color temperature;
   a lighting direction;
   a light spreading angle;
   an illumination area;
   a lighting pattern; and
   a light dynamics.

7. The lighting control device of claim 1, wherein the first appearance comprises one or more of:
   a hue;
   a saturation;
   an intensity;
   a brightness;
   a red-green-blue—RGB—value;
   a color temperature;
   a shape;
   a tactile property;
   a representation of a lighting direction;
   a representation of a light spreading angle;
   a representation of an illumination area;
   a representation of a lighting pattern;
   a two-dimensional representation of a lighting orientation in a space comprising the one or more light sources;
   a three-dimensional representation of a lighting orientation in a space comprising the one or more light sources;
   a digital photograph;
   a video clip; and
   a dynamic image.

8. The lighting control device of claim 1, wherein the element appearance control unit is adapted to set the first appearance of the first user interaction element based on at least one of the lighting parameters of the first light setting.

9. The lighting control device of claim 1, wherein the element appearance control unit is adapted to determine a plurality of suggested appearances based on at least one of the lighting parameters of the first light setting and to set the first appearance associated with the first user interaction element to an appearance selected by a user from the plurality of suggested appearances.

10. A method of a lighting control device for controlling light sources remote from the lighting control device, comprising:
   controlling one or more lighting parameters of each one or more light sources by the remotely operated lighting control device;
   modifying at least one lighting parameter of the one or more light sources using the lighting control device;
   providing a touch screen display with at least a first touch area on the lighting control device comprising at least a first user interaction element displayed on the first touch area of the touch screen display for receiving a user input;
   storing at least a first light setting,
   the first light setting including at least one lighting parameter value for at least one light source from the one or more light sources,
   saving the lighting parameter values of the stored at least first light setting in a memory on the remotely operated lighting control device,
   setting the lighting parameters of the one or more light sources by a light setting control unit according to the first light setting in response to the user input received via the first user interaction element,
   setting a first appearance on the lighting control device,
   wherein the first appearance is based on at least one of the lighting parameters of the first light setting stored by the at least first user interaction element and includes a representation on the lighting control device of the first light setting, and
   associating the first appearance with the first user interaction element to enable a user to find and select the stored first light setting on the lighting control device.

11. The method of claim 10, wherein the step of setting the first appearance associated with the first user interaction element is performed in response to parameter values of the one or more lighting parameters of the first light setting being saved in the memory as a new light setting.

12. The method of claim 10, wherein the step of setting the first appearance associated with the first user interaction element is performed in response to the parameter values of the one or more lighting parameters of first light setting being saved in the memory as an update of a previously saved light setting.

13. The method of claim 10, further comprising:
   saving the first light setting and associating the first light setting with the first user interaction element.

14. A method for controlling a lighting control device, comprising:
   selecting at least one selected light source from a plurality of light sources;
   transmitting a select control signal to the at least one selected light source for modification of light output;
   indicating by the at least one selected light source to verify that it has been selected;
   using a plurality of user control elements on the lighting control device to modify at least one lighting parameter value of the at least one selected light source;
   saving in memory the at least one lighting parameter value of a stored at least a first light setting;
   collecting by an element appearance control unit the at least one lighting parameter value of the at least first light setting;
   providing a touch screen display with at least a first touch area on the lighting control device comprising at least a first user interaction element displayed on the first touch area of the touch screen display for receiving a user input;
   variably setting by the element appearance control unit of the first user interaction element a first appearance associated with the at least one lighting parameter value of the at least a first light setting;
   wherein the first appearance includes a representation on the lighting control device of the first light setting to enable a user to find and select the stored first light setting on the lighting control device.

* * * * *